US011300443B2

(12) United States Patent
DePinto et al.

(10) Patent No.: US 11,300,443 B2
(45) Date of Patent: Apr. 12, 2022

(54) COVER FOR TESTING A LIGHT SENSOR

(71) Applicant: Commonwealth Edison Company, Chicago, IL (US)

(72) Inventors: Nicholas DePinto, Roselle, IL (US); Jason Stanislaus, Glendale Heights, IL (US); Misael Hernandez, Hinsdale, IL (US)

(73) Assignee: Commonwealth Edison Company, Chicago, IL (US)

(*) Notice: Subject to any disclaimer, the term of this patent is extended or adjusted under 35 U.S.C. 154(b) by 88 days.

(21) Appl. No.: 16/774,645

(22) Filed: Jan. 28, 2020

(65) Prior Publication Data
US 2021/0231489 A1    Jul. 29, 2021

(51) Int. Cl.
*G01J 1/02* (2006.01)
*G01J 1/42* (2006.01)

(52) U.S. Cl.
CPC ........... *G01J 1/0295* (2013.01); *G01J 1/0271* (2013.01); *G01J 1/4204* (2013.01)

(58) Field of Classification Search
CPC ...... G01J 1/0295; G01J 1/4204; G01J 1/0422; G01J 1/0403; G01J 1/0271; H04N 5/2252; G01D 11/245; F21V 23/0464
See application file for complete search history.

(56) References Cited

U.S. PATENT DOCUMENTS

| 7,109,880 | B2* | 9/2006 | Sibalich | F21S 8/02 |
| | | | | 340/693.5 |
| 10,117,002 | B2 | 10/2018 | Martin et al. | |
| 2010/0294915 | A1* | 11/2010 | Williams | G01J 5/0896 |
| | | | | 250/206.1 |
| 2018/0012457 | A1 | 1/2018 | Wegner | |
| 2018/0180467 | A1 | 6/2018 | Ordonez | |

FOREIGN PATENT DOCUMENTS

| CN | 201181239 Y | * | 1/2009 |
| JP | 2002352678 A | * | 12/2002 |
| JP | 2008003038 A | | 1/2008 |

\* cited by examiner

*Primary Examiner* — Jennifer D Bennett
(74) *Attorney, Agent, or Firm* — Ballard Spahr LLP

(57) ABSTRACT

A cover mountable over a sensor includes a hood and a baffle. The cover is adapted to create a barrier between the sensor and ambient light. The hood surrounds an interior volume for receiving the sensor. The baffle has a sidewall that surrounds an opening providing access to the volume.

11 Claims, 3 Drawing Sheets

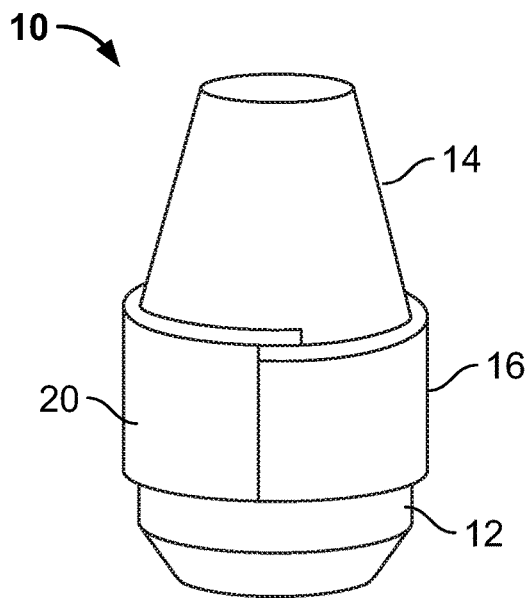
FIG. 1
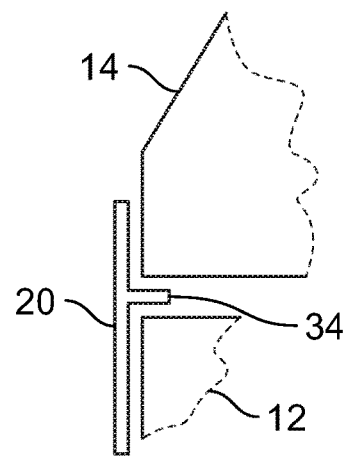
FIG. 1A
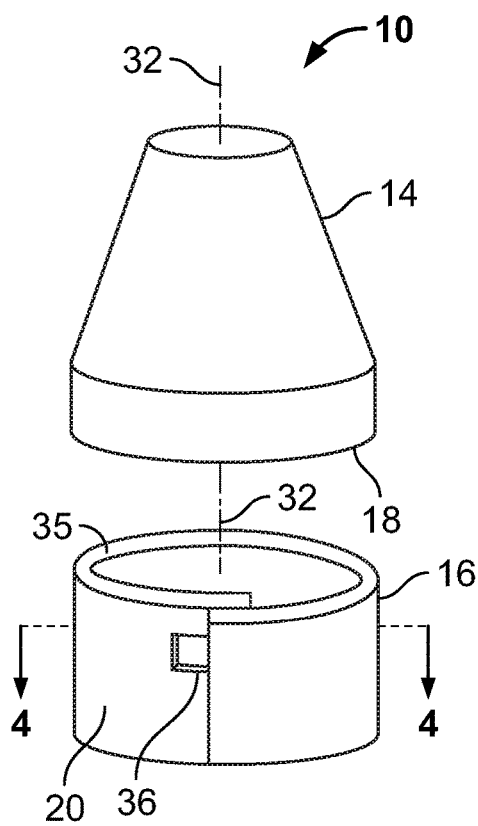
FIG. 2
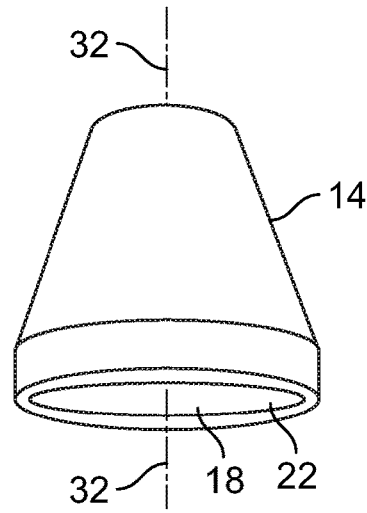
FIG. 2A
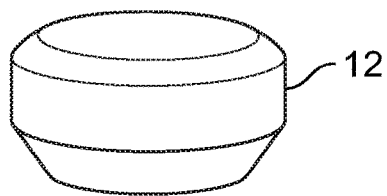

COVER FOR TESTING A LIGHT SENSOR

FIELD OF THE INVENTION

This invention relates to covers mountable over sensors.

BACKGROUND

Photo-electric control testers are used to test sensors mounted atop streetlights. The sensors measure the amount of ambient light in the area surrounding the sensor, and are electrically coupled to the light, switching the light on or off. The light is switched on when the sensor detects an insufficient level of ambient light. The light is switched off when the sensor detects a sufficient level of ambient light. An inoperative or flickering light indicates that a sensor is malfunctioning. To assess the sensor operation field technicians are dispatched, often during daylight hours, using the photo electric control tester to simulate darkness. The tester creates a barrier between the ambient light and the sensor, thereby enabling the sensor to switch on the light. If the light does not illuminate or if the light flickers with the light switched on, the field technician performing the test may repair the sensor.

However photo-electric control testers do not fit all sensors. If a sensor is larger and not completely covered by the existing tester, the tester does not create an effective barrier between the ambient light and the sensor. There is clearly a need for a device, to be used with existing photo-electric control testers, to cover sensors that are larger and not completely covered by the existing testers.

SUMMARY

This invention concerns a cover mountable over a sensor. The cover is adapted to create a barrier between the sensor and ambient light. The cover comprises a hood and a baffle. The hood surrounds an interior volume for receiving the sensor. The baffle surrounds an opening providing access to the volume.

By way of example, the baffle comprises a sidewall. The sidewall comprises a first end portion and a second end portion. In a particular example, the first and second end portions are movable between a first position and a second position. The first end portion and the second end portion are in spaced apart relation to one another when in the first position. The first end portion overlies the second end portion when in the second position.

As an example a cross sectional shape of the sidewall is selected from the group consisting of: oval, circular, and elliptical.

By way of example, the baffle further comprises an axis co-axially aligned with the sidewall, wherein the first end portion moves relative to the second end portion about the axis, thereby adjusting a size of the baffle. In a particular example, the baffle further comprises a plurality of shoulders projecting from the sidewall into a central space surrounded by the sidewall. The shoulders are positioned about the axis and between the hood and the sensor.

As an example, the baffle further comprises a notch positioned in the sidewall in one of the first and second end portions. In a particular example, the first end portion overlies the second end portion, and the second end portion is between the first end portion and the central space. In another particular example, the notch is positioned in the second end portion.

In an example, the hood further comprises an appendage comprising proximate and distal ends. The appendage projects transverse to the axis. The proximate end is attached to the hood.

By way of example, the appendage is received by the notch. In an example, the hood abuts the shoulders. By way of example, the baffle overlaps both a portion of the hood and a portion of the sensor.

BRIEF DESCRIPTION OF THE DRAWINGS

FIG. 1 is an isometric view of an example cover according to the invention;

FIG. 1A is a partial sectional view of a portion of the example cover according to the invention;

FIG. 2 is an exploded isometric view of the example cover;

FIG. 2A is an isometric view of a portion of the example cover;

DETAILED DESCRIPTION

Figure 3:
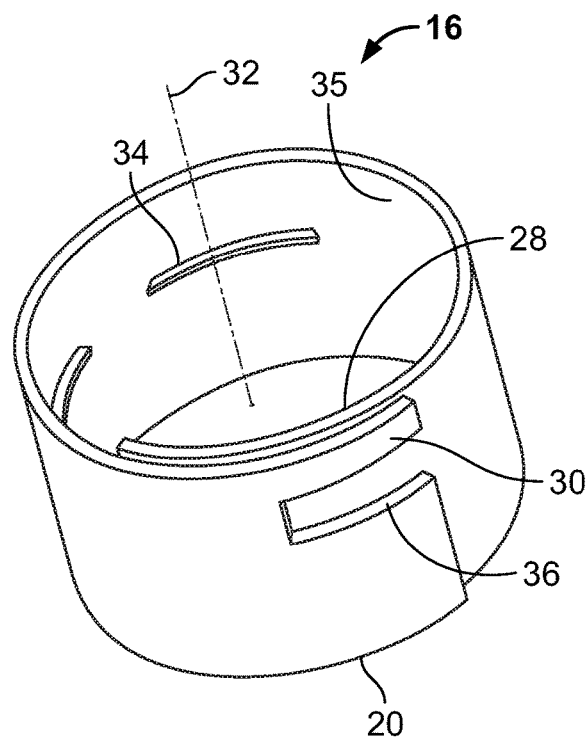
FIG. 3 is an isometric view of a portion of the example cover.

This invention concerns a cover, including a photo-electric control tester, mountable over sensors. The cover creates a barrier between the sensor and the ambient light.

An example embodiment of a cover 10 according to this invention is shown in FIGS. 1 and 2. The cover 10 is mountable over a sensor 12 and creates a barrier between the sensor 12 and ambient light. The sensor 12 may be a light sensor mounted atop a street light. The cover 10 includes a hood 14 and a baffle 16. The hood 14 surrounds an interior volume 18, shown in FIG. 2A. The sensor 12 is received by the interior volume 18, as shown in FIG. 2. The baffle 16 surrounds an opening 22 providing access to the interior volume 18.

Figure 4:
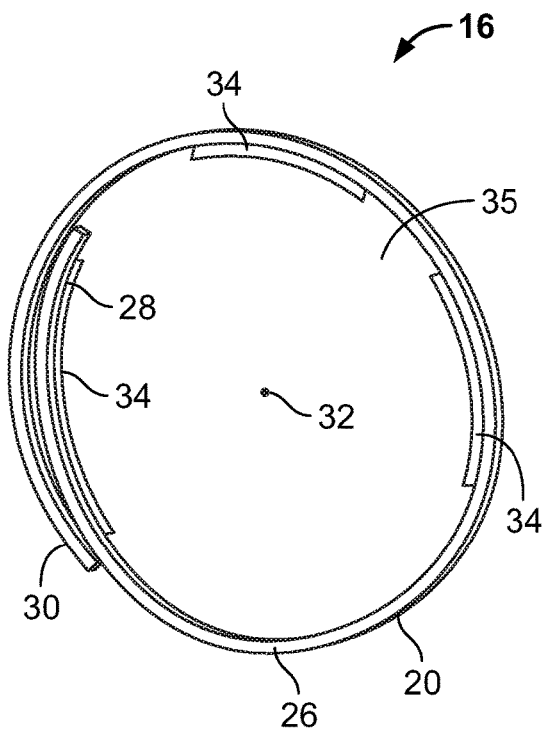
FIG. 4 is a sectional view of a portion of the example cover taken at line 4-4 of FIG. 2.

As shown in FIGS. 3 and 4, the baffle 16 comprises a sidewall 20 having a first end portion 28 and a second end portion 30. The first and second end portions extend around the sidewall 20 from respective first and second ends of sidewall 20. The first and second end portions 28 and 30 are movable between a first position and a second position. In the first position, shown in FIG. 6A, the first and second end portions 28 and 30 may be in spaced apart relation to one another. In the second position, shown in FIG. 6C, the first end portion 28 may overlie the second end portion 30. The cross sectional shape 24 of the sidewall 20 may be oval, circular, or elliptical. FIG. 4 illustrates an example of the sidewall 20 in an elliptical shape 26.

The baffle 16 also defines an axis 32 which is co-axially aligned with the sidewall 20, as shown in FIGS. 3 and 4. The first and second end portions 28 and 30 of the sidewall 20 move relative to each other about the axis 32. By moving relative to each other, the first and second end portions 28 and 30 provide adjustment to the size of the baffle 16. The sidewall 20 of baffle 16 may be fabricated via a three dimensional printing process using materials such as nylon, epoxy, thermal plastic, or other materials compatible with three dimensional printing process. Alternatively, the baffle 16 may be fabricated from sheet metal. The sidewall 20 may be fabricated so that the first end portion 28 overlies the second end portion 30 or that the second end portion 30 overlies the first end portion 28 in an undeformed shape. The first and second end portions 28 and 30 move relative to each other, with first and second end portions 28 and 30 returning to the undeformed shape, with no plastic deformation. With the sidewall 20 fabricated so there is no plastic deformation as the first and second end portions move, the first and second end portions 28 and 30 of the sidewall 20 are biased to be closed.

The baffle 16 may further include a plurality of shoulders 34 which project from the sidewall 20 into a central space 35, as shown in FIGS. 3 and 4. The shoulders 34 support the hood 14 in spaced relation from the sensor 12. The shoulders 34 are positioned about the axis 32 and are located between the hood 14 and the sensor 12 (see FIG. 1A). During assembly as the baffle 16 is positioned around the hood 14 (see FIG. 1), the shoulders 34 abut the hood 14 (see FIG. 1A). The shoulders 34 are located so that the sidewall 20 of baffle 16 overlaps both a portion of the hood 14 and a portion of the sensor 12, thereby providing a barrier between the sensor 12 and the ambient light. The shoulders 34 are also used to increase the stiffness of the baffle 16, so that the hood 14 does not move relative to the baffle 16 once assembled into cover 10, as described below.

Figure 5:
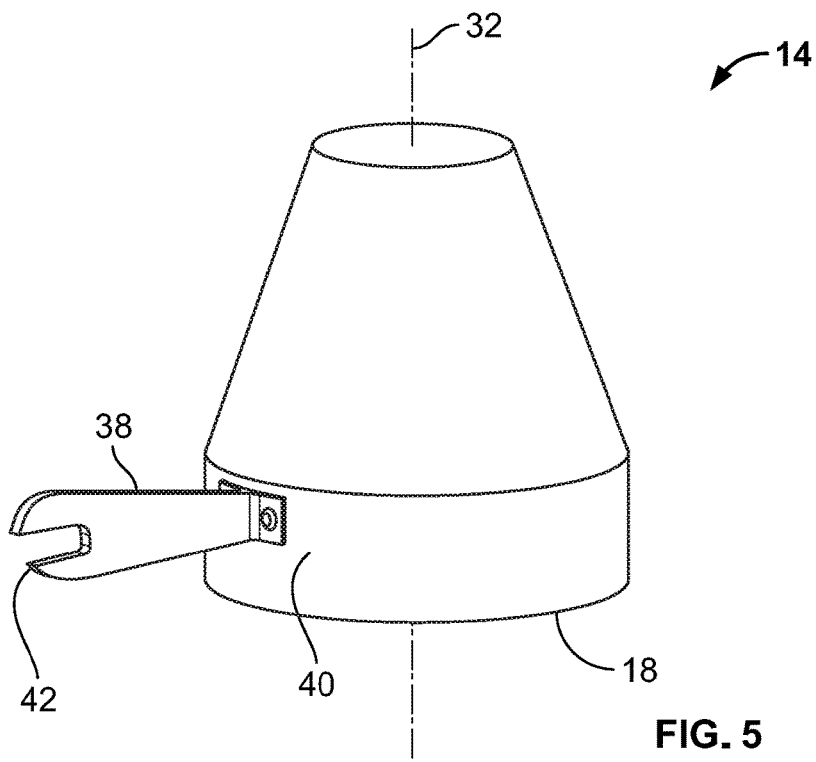
FIG. 5 is an isometric view of a portion of the example cover.

As shown in FIG. 5, the hood 14 may further include an appendage 38 projecting transverse to the axis 32. The appendage 38 comprises proximate and distal ends 40 and 42. The proximate end 40 is attached to the hood 14. The distal end 42 may be adapted for attachment to an external tool, such as a 'hot stick,' not shown. The distal end 22, may be adapted to receive a fastener for attachment to the hot stick. Attachment to the hot stick allows placement of the cover over a sensor without the use of additional powered equipment such as a bucket truck.

The baffle 16, shown in FIGS. 3 and 4, may further include a notch 36 positioned in the sidewall 20 in one of the first and second end portions 28 and 30. FIG. 3 illustrates an example of the sidewall 20 with the notch 36 positioned in the second end portion 30, with the first end portion 28 located between the second end portion 30 and the central space 35. Alternatively, the second end portion 30 may be located between the first end portion 28 and the central space 35.

Figure 6A:
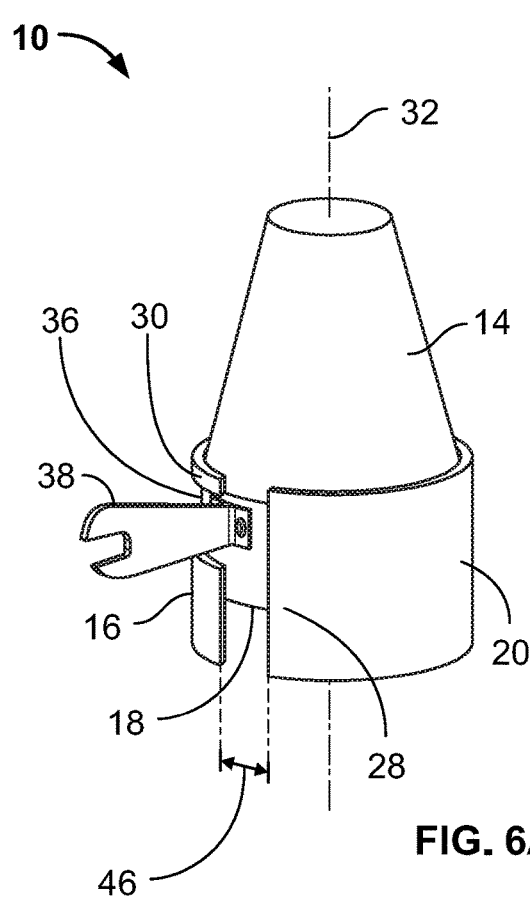
FIGS. 6A, 6B and 6C are isometric views of portions of the example cover, showing the installation of a baffle on a hood.
Figure 6B:
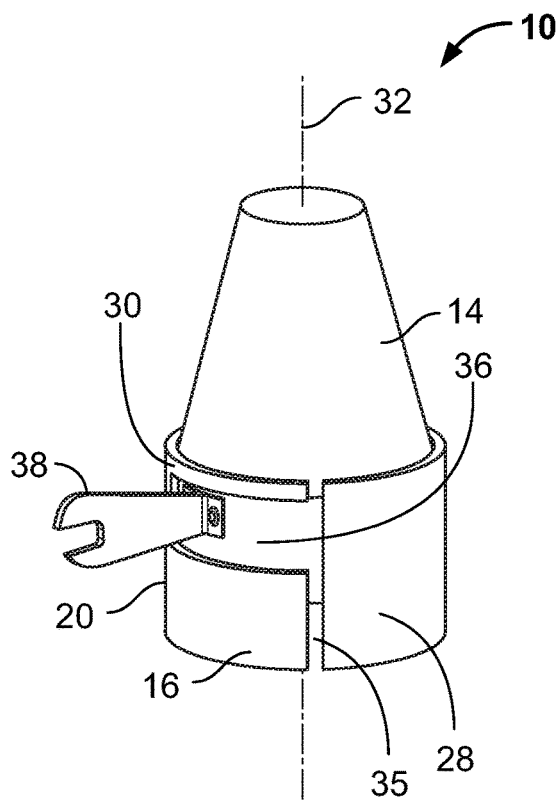
Figure 6C:
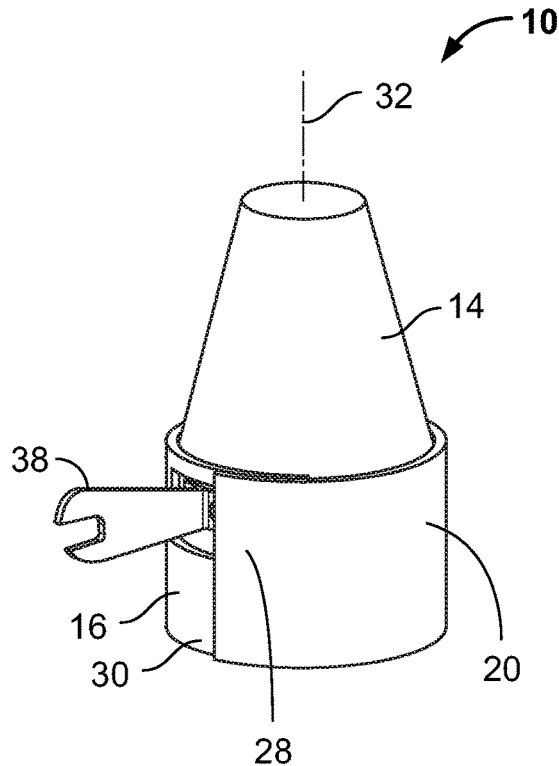

FIG. 6A shows an example of a partially assembled cover 10, with the baffle 16 surrounding the hood 14. During the assembly of the baffle 16 around the hood 14, the first and second end portions 28 and 30 of the sidewall 20 move relative to one another about the axis 32 to a position where the first end portion 28 is in spaced apart relation to the second end portion 30. The first and second end portions 28 and 30 in this configuration form a gap 46 of sufficient size to enable the baffle 16 to slip over the appendage 38. With first and second end portions 28 and 30 deformed in this manner, the sidewall 20 is moved axially along the axis 32 over the hood 14 until the notch 36 aligns with the appendage 38. With the notch 36 aligned with the appendage 38, the notch 36 is positioned to receive the appendage 38, as shown in FIG. 6A. As the second and first end portions 30 and 28 move from the deformed position toward an undeformed position, about the axis 32, with the second end portion 30 located between the first end portion and the central space 35, the appendage 38 contacts the notch 36, shown in FIG. 6B. The first end portion 28 moves relative to the second end portion 30 until the first end portion 28 contacts the appendage 38, shown in FIG. 6C. The notch 38 in the second end portion 30 surrounds the appendage 38, and first end portion 28 overlies the second end 30, thus enclosing the appendage 38 within the sidewall 20. With the appendage 38 enclosed within the sidewall 20, the hood 14 abutting the shoulder 34 and the first and second end portions 28 and 30 biased to be closed, the hood 14 is thus secured to the baffle 16.

The cover as described herein is expected to provide a barrier between ambient light and the sensor, and facilitate testing of different sized sensors, when the sensors are larger and not completely covered by the existing hoods.

What is claimed is:

1. A cover mountable over a sensor, said cover adapted to create a barrier between said sensor and ambient light to simulate darkness, said cover comprising:
    a hood surrounding an interior volume for receiving said sensor, and
    a baffle surrounding an opening providing access to said volume, said baffle comprising a sidewall, said sidewall comprising a first end portion and a second end portion, said baffle further comprising an axis co-axially aligned with said sidewall, wherein said first end portion moves relative to said second end portion about said axis, thereby adjusting a size of said baffle.

2. The cover according to claim 1, wherein said first and second end portions are movable between a first position and a second position,
    wherein said first end portion and said second end portion are in spaced apart relation to one another when in said first position, and
    wherein said first end portion overlies said second end portion when in said second position.

3. The cover according to claim 1, wherein a cross sectional shape of said sidewall is selected from the group consisting of: oval, circular, and elliptical.

4. The cover according to claim 1, wherein said baffle further comprises a plurality of shoulders projecting from said sidewall into a central space surrounded by said sidewall, said shoulders being positioned about said axis and between said hood and said sensor.

5. The cover according to 1, wherein said baffle further comprises a notch positioned in said sidewall in one of said first and second end portions.

6. The cover according to claim 5, wherein said first end portion overlies said second end portion, said second end portion between said first end portion and said central space.

7. The cover according to claim 6, wherein said notch is positioned in said second end portion.

8. The cover according to claim 5, wherein said hood further comprises an appendage comprising proximate and distal ends, said appendage projecting transverse to said axis, said proximate end being attached to said hood.

9. The cover according to claim 8, wherein said appendage is received by said notch.

10. The cover according to claim 4, wherein said hood abuts said shoulders.

11. The cover according to claim 4, wherein said baffle overlaps both a portion of said hood and a portion of said sensor.

* * * * *